United States Patent

Watanabe et al.

[11] Patent Number: 5,953,481
[45] Date of Patent: Sep. 14, 1999

[54] REPRODUCING APPARATUS HAVING AN EDITING FUNCTION

[75] Inventors: Yoshiyuki Watanabe, Kokubunji; Junichi Sato, Yokohama, both of Japan

[73] Assignee: Canon Kabushiki Kaisha, Tokyo, Japan

[21] Appl. No.: 08/758,963

[22] Filed: Dec. 2, 1996

[30] Foreign Application Priority Data

Jan. 8, 1996 [JP] Japan ..................................... 8-016969
Jan. 10, 1996 [JP] Japan ..................................... 8-018278

[51] Int. Cl.⁶ .............................. H04N 5/225; H04N 5/92
[52] U.S. Cl. ........................... 386/52; 386/117; 348/239; 348/333
[58] Field of Search ................................... 386/4, 52, 54, 386/55, 60, 62, 64–65, 117, 38; 360/13; 369/83; 348/732, 734, 207, 211, 212, 213, 231, 232, 233, 239, 333, 334, 341; 358/909.1, 906; H04N 5/76, 5/92, 5/78, 5/781, 5/782, 5/783, 5/225

[56] References Cited

U.S. PATENT DOCUMENTS

| | | | |
|---|---|---|---|
| 5,055,937 | 10/1991 | Yamada et al. | 386/64 |
| 5,067,029 | 11/1991 | Takahashi | 358/909.1 |
| 5,130,813 | 7/1992 | Oie et al. | 358/909.1 |
| 5,469,270 | 11/1995 | Yamamoto | 360/13 |
| 5,526,125 | 6/1996 | Mori et al. | 386/52 |
| 5,568,275 | 10/1996 | Norton et al. | 386/52 |
| 5,578,999 | 11/1996 | Matsuzawa et al. | 348/734 |
| 5,621,536 | 4/1997 | Kizu | 386/52 |
| 5,657,414 | 8/1997 | Lett et al. | 348/734 |

Primary Examiner—Thai Tran
Attorney, Agent, or Firm—Robin, Blecker & Daley

[57] ABSTRACT

A reproducing apparatus having an editing function for editing an information signal recorded on a recording medium, by using a remotely operable external recording apparatus, is arranged to hold beforehand a plurality of kinds of remote operation control data codes which are provided for remotely operating a respective one of a plurality of kinds of recording apparatuses usable as the external recording apparatus and which are respectively associated with the plurality of kinds of recording apparatuses, to select, from among the held plurality of kinds of remote operation control data codes, remote operation control data codes associated with a recording apparatus actually used as the external recording apparatus, and, prior to performing an editing action, so as to cause the recording apparatus actually used as the external recording apparatus to perform a predetermined operation, to transmit, to the recording apparatus actually used as the external recording apparatus, a remote operation control instruction according to a remote operation control data code for performing the predetermined operation among the selected remote operation control data codes. The arrangement permits, at a low cost, the editing function to be easily carried out for editing an information signal recorded on the recording medium, by using the remotely operable recording apparatus.

11 Claims, 9 Drawing Sheets

F I G. 5

```
MENU

▶RECORDING VTR CODE · · · CANON2
```

REPRODUCING APPARATUS HAVING AN EDITING FUNCTION

BACKGROUND OF THE INVENTION

1. Field of the Invention

This invention relates to a reproducing apparatus having an editing function for editing information signals recorded on a recording medium, by using a remotely operable external recording apparatus.

2. Description of Related Art

Some of known reproducing apparatuses have an editing function for editing information signals recorded on a recording medium, by using in conjunction therewith a remotely operable external recording apparatus.

A camera-integrated type VTR (video tape recorder) as an example of a reproducing apparatus having such an editing function will be described with reference to FIG. 1. FIG. 1 is a block diagram showing the respective arrangements of a conventional camera-integrated type VTR 20 having the editing function and a stationary type VTR 11 connected thereto.

The stationary type VTR 11 is used, as shown in FIG. 1, for editing video signals which were recorded on a recording medium by the camera-integrated type VTR 20 having the editing function. The camera-integrated type VTR 20 is provided with a recording and reproducing part 21 for recording and reproduction. The recording and reproducing part 21 includes a system control part 22 arranged to perform control over the processes of the editing function as well as control over the whole apparatus, a remote-control signal transmitting part 23, a remote-control signal receiving part 25 and a remote-control signal storing circuit 24.

The processes of the editing function are performed as follows. Remote-control signals are transmitted from a remote-control signal transmitter 14 which is provided for the stationary type VTR 11 for the purpose of remotely controlling the camera-intergrated type VTR 20. The recording and reproducing part 21 of the camera-integrated type VTR 20 then receives at the remote-control signal receiving part 25 the remote-control signals which include a pause instruction and a pause cancel instruction. Then, the pause instruction and the pause cancel instruction as received are analyzed. Through the analyzing process, a code string which forms each of the pause instruction and the pause cancel instruction is extracted. The code strings thus extracted are held at the remote-control signal storing circuit 24. The code string is read out from the remote-control signal storing circuit 24 according to a reproducing action of the camera-integrated type VTR 20. A remote-control signal which is composed of the code string read out is transmitted from the remote-control signal transmitting part 23 to the stationary type VTR 11 with an infrared light employed as a carrier wave.

More specifically, when the camera-integrated type VTR 20 begins to perform a reproducing action, the code string of the pause cancel instruction is read out from the remote-control signal storing circuit 24. A remote-control signal for the pause cancel instruction which is composed of the code string read out is sent to the stationary type VTR 11 from the remote-control signal transmitting part 23. When the reproducing action of the camera-integrated type VTR 20 comes to a stop, on the other hand, the code string of the pause instruction is read out from the remote-control signal storing circuit 24. Then, a remote-control signal for the pause instruction which is composed of the code string read out is sent to the stationary type VTR 11 from the remote-control signal transmitting part 23.

The stationary type VTR 11 is provided with a recording and reproducing part (not shown) disposed within the body of the VTR 11, a remote-control signal receiving part 12, a system control part 13, and the remote-control signal transmitter 14, which is disposed outside the stationary type VTR 11.

The system control part 13 is arranged to control recording and reproducing actions and the actions of the whole apparatus including actions to be performed in accordance with the remote-control signals coming from the remote-control signal transmitter 14 provided for the stationary type VTR 11 and also processes to be carried out when editing the video signals recorded by the camera-integrated type VTR 20.

When controlling the processes of editing video signals recorded by the camera-integrated type VTR 20, the remote-control signal transmitted from the camera-integrated type VTR 20 is received by the remote-control signal receiving part 12. The system control part 13 then controls actions on the basis of the remote-control signal received. More specifically, when the remote-control signal receiving part 12 of the stationary type VTR 11 receives a pause cancel instruction transmitted from the remote-control signal transmitting part 23 of the camera-integrated type VTR 20 while a recording action is in a paused state, the system control part 13 releases the recording action from the paused state according to the pause cancel instruction and causes the recording action to be resumed. On the other hand, when the remote-control signal receiving part 12 receives a pause instruction transmitted from the remote-control signal transmitting part 23 of the camera-integrated type VTR 20 while the stationary type VTR 11 is in process of recording, the recording action is put to a paused state according to the pause instruction.

The processes of editing the video signals recorded by the camera-integrated type VTR 20 are performed by using the stationary type VTR 11 in the following manner.

First, the code strings which respectively form the pause instruction and the pause cancel instruction applicable to the stationary type VTR 11 are stored in the remote-control signal storing circuit 24. For this storing action, a remote-control signal indicative of the pause instruction is transmitted to the remote-control signal receiving part 25 of the camera-integrated type VTR 20 from the remote-control signal transmitter 14 which is provided for the stationary type VTR 11. Upon receipt of the remote-control signal indicative of the pause instruction by the remote-control signal receiving part 25, the code string of the pause instruction indicated by the remote-control signal is extracted and held by the remote-control signal storing circuit 24.

Similarly, a remote-control signal indicative of the pause cancel instruction is transmitted to the remote-control signal receiving part 25 from the remote-control signal transmitter 14 of the stationary type VTR 11. The code string of the pause cancel instruction indicated by the remote-control signal is also extracted and held by the remote-control signal storing circuit 24.

Upon completion of the processes of storing the code string of the pause instruction and that of the pause cancel instruction at the remote-control signal storing circuit 24, the stationary type VTR 11 is set in a state of having a recording action in pause. After that, the camera-integrated type VTR 20 begins a reproducing action on video signals from a predetermined editing point.

After the commencement of the reproducing action of the camera-integrated type VTR 20, the code string of the pause cancel instruction is read out from the remote-control signal storing circuit 24. Then, a remote-control signal for the pause cancel instruction which is composed of the code string read out is transmitted from the remote-control signal transmitting part 23 to the stationary type VTR 11. The pause cancel instruction transmitted from the remote-control signal transmitting part 23 is received by the remote-control signal receiving part 12. The system control part 13 then releases the recording action of the stationary type VTR 11 from the paused state in accordance with the pause cancel instruction. Then, the video signal reproduced by the camera-integrated type VTR 20 and transmitted to the stationary type VTR 11 through video and audio signal lines is recorded on a magnetic tape at the stationary type VTR 11.

Subsequently, the reproducing action of the camera-integrated type VTR 20 is put to a paused state when the video signal has been reproduced up to a predetermined editing end position by the camera-integrated type VTR 20. Upon arrival at the paused state of the reproducing action, the code string of the pause instruction is read out from the remote-control signal storing circuit 24. A remote-control signal for the pause instruction which is composed of the code string read out is transmitted to the stationary type VTR 11 from the remote-control signal transmitting part 23. The pause instruction transmitted from the remote-control transmitting part 23 is received by the remote-control signal receiving part 12. The system control part 13 then puts the recording action to a paused state in accordance with the pause instruction. The process of recording the video signal reproduced by the camera-integrated type VTR 20 on the magnetic tape by the stationary type VTR 11 is thus put to the paused state.

Video signals recorded by the camera-integrated type VTR 20 thus can be edited by repeating the processes described above.

The remote-control signal storing circuit 24 is thus arranged to hold the respective code strings of the pause instruction and the pause cancel instruction to be given to the stationary type VTR 11 when editing video signals recorded by the camera-integrated type VTR 20 by using the stationary type VTR 11. This arrangement permits control over the recording action of the stationary type VTR 11 with the remote-control signals transmitted in association with the reproducing action of the camera-integrated type VTR 20. The arrangement not only dispenses with use of an editing machine but also almost completely eliminates the limits of a selectable range of VTRs usable as the stationary type VTR 11.

Further, since the recording action of the stationary type VTR 11 is controlled by the remote-control signals transmitted in association with the reproducing action of the camera-integrated type VTR 20, the reproducing action of the camera-integrated type VTR 20 and the recording action of the stationary type VTR 11 can be synchronized with each other without difficulty, so that the editing processes can be accurately carried out.

However, since the conventional camera-integrated type VTR is arranged to hold the respective code strings of the pause instruction and the pause cancel instruction applicable to the stationary type VTR 11 at the remote-control signal storing circuit 24, it is necessary to receive the remote-control signals applicable to the stationary type VTR 11, to analyze the remote-control signals received and then to extract corresponding code strings. These processes require complex control actions and result in a cost increase.

Further, the respective code strings of the pause instruction and the pause cancel instruction applicable to the stationary type VTR 11 to be used for editing vary with the kind of the stationary type VTR 11 and must be stored at the remote-control signal storing circuit 24 every time the kind of the stationary type VTR 11 to be used for editing changes. Therefore, during the storing process, if the remote-control signals transmitted from the remote-control signal transmitter 14 of the stationary type VTR 11 are not accurately received by the remote-control signal receiving part 25 of the camera-integrated type VTR 20, the remote-control signal storing circuit 24 might hold some code strings that differ from the code strings of the pause instruction and the pause cancel instruction applicable to the stationary type VTR 11. Then, it might become impossible to control the recording action of the stationary type VTR 11 with the remote-control signal transmitted in association with the reproducing action of the camera-integrated type VTR 20. In such a case, the code strings of the pause instruction and the pause cancel instruction applicable to the stationary type VTR 11 must be stored all over again at the remote-control signal storing circuit 24. It is troublesome to repeat the storing process.

FIG. 2 is a diagram for explaining a conventional editing method for video tapes. According to the conventional editing method, editing work is performed by connecting the video and audio outputs 30b of a VTR 31 on a reproduction side to the inputs of a VTR 32 on a recording side, and by connecting a dedicated editing machine 33 to both of the VTRs 31 and 32 on the reproducing and recording sides. In order to program a plurality of editing start points (hereinafter referred to as cut-in points) and a plurality of editing end points (hereinafter referred to as cut-out points), the editing machine 33 as connected is operated to send out a command 30a to the VTR 31 on the reproducing side and to store therein a plurality of cut-in points and a plurality of cut-out points.

After the cut-in and cut-out points are stored, the command 30a is sent out from the editing machine 33 to the reproducing-side VTR 31 for reproducing a record part from a programmed cut-in point to a programmed cut-out point. In accordance with the command 30a, the editing machine 33 sends out a command 30c to the recording-side VTR 32 for starting and ending a recording action. An editing operation is thus automatically carried out while synchronizing the reproducing-side VTR 31 and the recording-side VTR 32 with each other.

The terms "cut-in point" and "cut-out point" as used herein respectively indicate tape count values obtained at the start and end points of each of scenes to be duplicated, or copied, from one tape to another tape. In the case of a system having absolute positions recorded on the tape, the absolute positions can be used as the tape count values. However, in general, a relative position in a tape is measured by counting a number of pulses outputted from a rotary body (capstan motor) which rotates while being pressed into contact with the tape.

During recent years, some of developed VTRs include the function of the above-stated editing machine. More specifically, the VTR has a programming function for deciding the cut-in and cut-out points, acts as a reproducing-side VTR to reproduce each applicable record from the cut-in point to the cut-out point according to the program thus obtained, and generates, during the reproducing process, commands for starting and ending a recording action in such a way as to control the recording action performed by another VTR disposed on the recording side.

The VTRs of this kind are generally arranged to use infrared remote-control signals as a means of controlling the VTR disposed on the recording side. Since the VTR is required to be capable of controlling any of VTRs made by different manufacturers, some of the VTRs of this kind are developed to include a function of learning remote-control codes of various kinds for editing.

The automatic editing operation to be performed with the VTR of the kind having the above-stated editing function has advantages in the following points. It dispenses with use of any editing machine. Limitations imposed on selecting a VTR to be used on the recording side are lessened. Wiring for editing can be simplified.

The conventional VTR of the kind mentioned above, however, presents problems which have been desired to be solved. One of the problems lies in that recorder keys, such as reproduction, stop and fast-feeding keys, and cut-in and cut-out input keys must be operated in a complex manner when programming the cut-in and cut-out points.

Another problem lies in that, when programming for editing, pictures are muted during the process of normal mode transition, such as FF (fast-feeding) → STOP (stopping) → PLAY (reproduction). Such muting makes a search for a desired editing point difficult because the desired point tends to pass unnoticed while pictures are in a mute state.

A further problem lies in the following point. When the VTR is operated in a normal mode by operating a key, such as a PLAY key, a STOP key, an FF key, a REW (rewinding) key, an FF search key or a REW search key, during an editing programming operation or while the editing operation is in process, a pinch roller and a capstan motor tend to be accidentally released from the state of being pressed into contact with each other. Under such a condition, according to the relative tape counting method, the count values of the cut-in and cut-out points would deviate from correct values.

BRIEF SUMMARY OF THE INVENTION

It is a general object of the invention to provide a reproducing apparatus which is capable of solving the above-described problems.

It is a more specific object of the invention to provide a reproducing apparatus which can be produced at a low cost and which is simply operable for carrying out an editing function for editing information signals recorded on a recording medium, by using a remotely operable external recording apparatus in conjunction therewith.

Under these objects, a reproducing apparatus arranged, according to one aspect of the invention, to have an editing function for editing an information signal recorded on a recording medium, by using a remotely operable external recording apparatus, comprises remote operation control data code holding means for holding beforehand a plurality of kinds of remote operation control data codes which are provided for remotely operating a respective one of a plurality of kinds of recording apparatuses usable as the external recording apparatus and which are respectively associated with the plurality of kinds of recording apparatuses, selecting means for selecting, from among the plurality of kinds of remote operation control data codes held by the remote operation control data code holding means, remote operation control data codes associated with a recording apparatus actually used as the external recording apparatus, remote operation control instruction transmitting means for, prior to performing an editing action, reading out, from the remote operation control data code holding means, the remote operation control data codes selected by the selecting means, so as to cause the recording apparatus actually used as the external recording apparatus to perform a predetermined operation, and for transmitting, to the recording apparatus actually used as the external recording apparatus, a remote operation control instruction according to a remote operation control data code for performing the predetermined operation among the remote operation control data codes read out, and reproducing means for reproducing the information signal recorded on the recording medium and for supplying the reproduced information signal to the recording apparatus actually used as the external recording apparatus.

It is another object of the invention to provide a reproducing apparatus arranged to permit accurate and efficient editing work on information signals recorded on a recording medium, by using a remotely operable external recording apparatus in conjunction therewith.

Under that object, a reproducing apparatus arranged, according to one aspect of the invention, to have an editing function for editing an information signal recorded on a recording medium, by using a remotely operable external recording apparatus, comprises reproducing means for reproducing the information signal recorded on the recording medium and for supplying the reproduced information signal to a recording apparatus usable as the external recording apparatus, designating means for designating an editing start point and an editing end point of the recording medium on which an information signal to be edited is recorded, storing means for storing a plurality of pieces of information relative to the editing start point and the editing end point of the recording medium designated by the designating means, control means for, according to information relative to the editing start point and the editing end point stored in the storing means, causing the reproducing means to perform a searching action for the editing start point of the recording medium and to perform an editing action for controlling starting and ending of a reproducing action on the recording medium, and for, during process of the editing action, controlling an operation of the recording apparatus used as the external recording apparatus, and editing action mode switching means for switching between an editing action setting mode in which the editing start point and the editing end point of the recording medium are designated by the designating means and an editing action performing mode in which the editing action is actually performed according to the editing start point and the editing end point of the recording medium designated in the editing action setting mode.

It is a further object of the invention to provide an editing method in which, when editing information signals recorded on a recording medium by using a remotely operable external recording apparatus, a search for editing points on the recording medium can be easily made and the editing work can be efficiently carried out.

Under the above-stated object, an editing method, according to one aspect of the invention, for editing an information signal recorded on a recording medium, by using a remotely operable external apparatus, comprises a designating step of, prior to performing an editing action, designating an editing start point and an editing end point of the recording medium on which an information signal to be edited is recorded, a storing step of storing information relative to the editing start point and the editing end point of the recording medium designated in the designating step, and an editing action performing step of, so as to actually perform the editing action according to the information relative to the editing start point and the editing end point of the recording medium stored in the storing step, performing a searching action for the editing start point of the recording medium and the editing action for controlling starting and ending of a reproducing action on the recording medium according to the information relative to the editing start point and the editing end point of the recording medium stored in the storing step, and of, during process of the editing action, controlling an operation of a recording apparatus used as the external recording apparatus.

Objects other than the objects described above and features of the invention will become apparent from the following detailed description of embodiments thereof taken in connection with the accompanying drawings.

BRIEF DESCRIPTION OF THE SEVERAL VIEWS OF THE DRAWING

FIG. 5 shows, by way of example, a menu picture displayed at a viewfinder of the camera-integrated type VTR shown in FIG. 3.

DETAILED DESCRIPTION OF THE INVENTION

In the following, preferred embodiments of the invention will be described with reference to the drawings.

Figure 1:
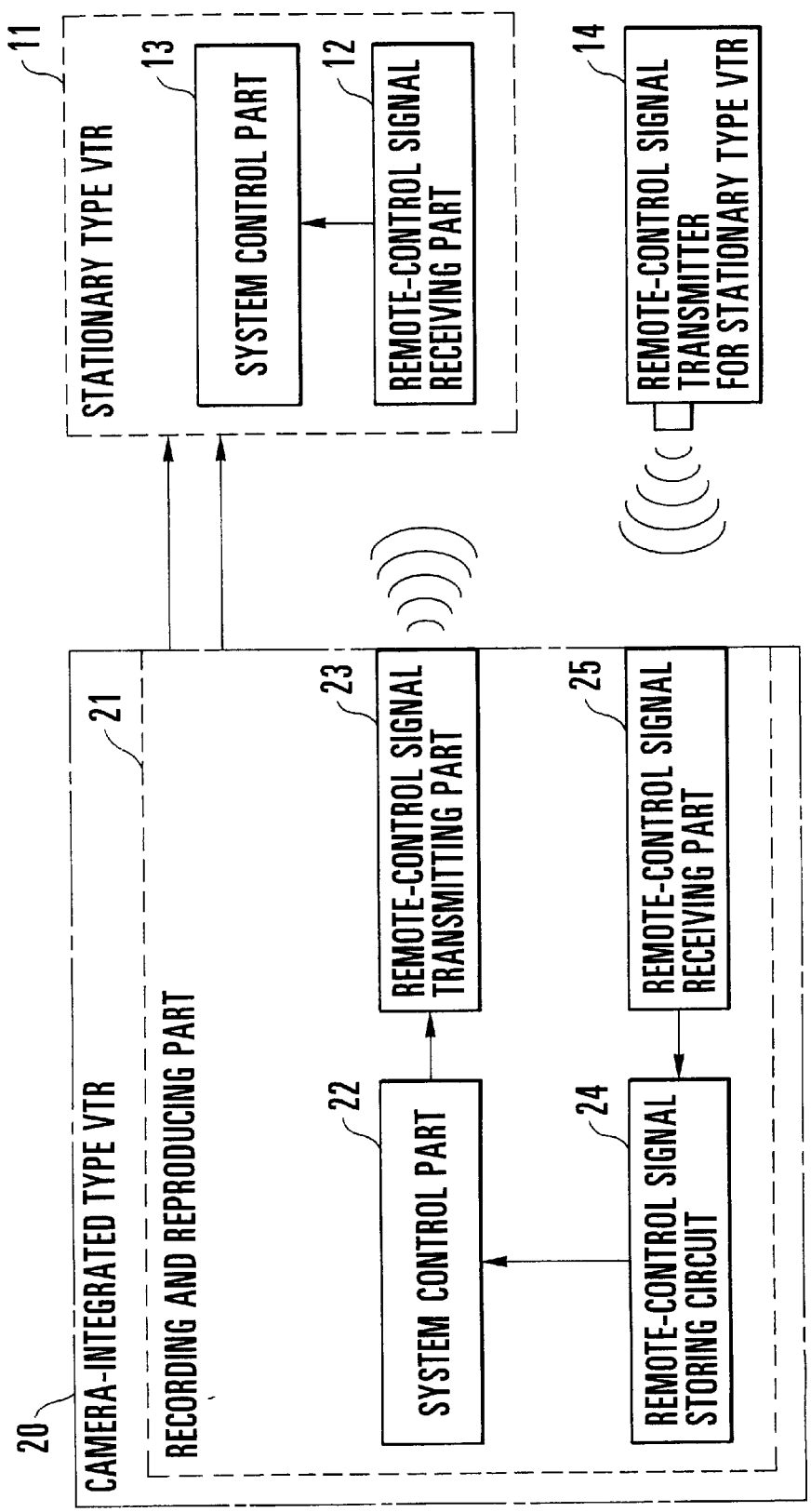
FIG. 1 is a block diagram showing the arrangement of the conventional camera-integrated type VTR having an editing function and that of a stationary type VTR which is connected to the camera-integrated type VTR.
Figure 2:
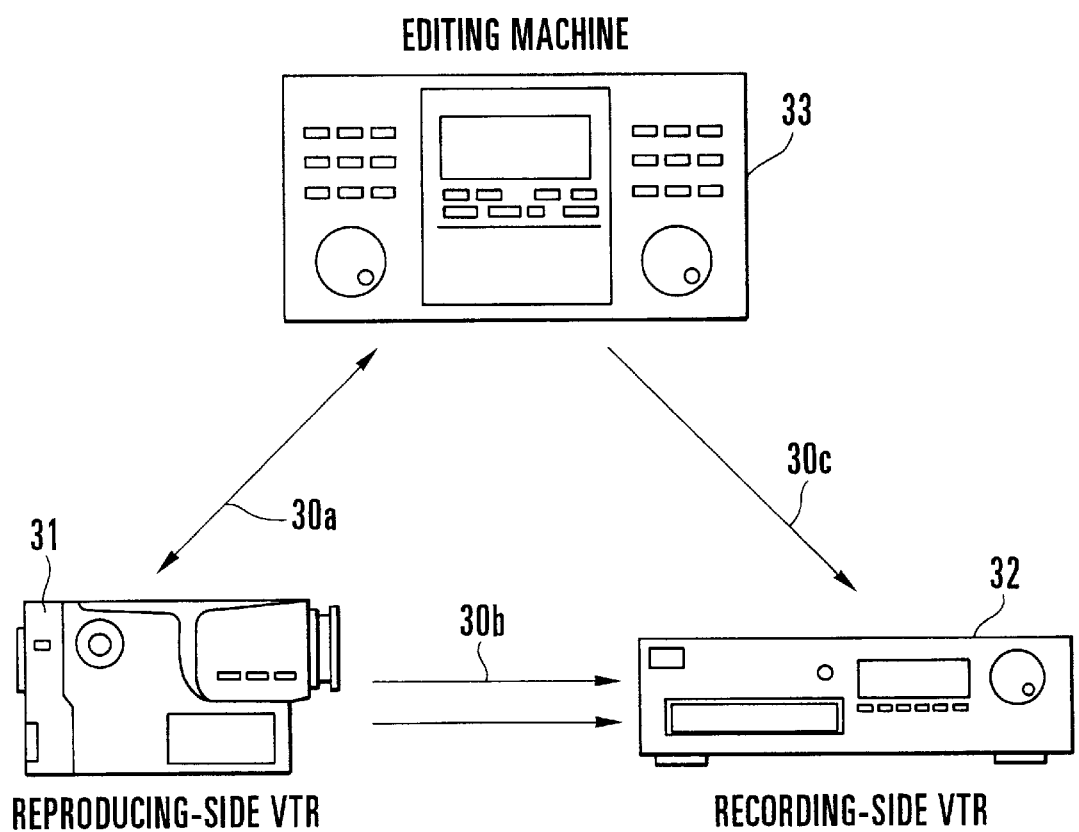
FIG. 2 is an explanatory diagram showing the conventional method for editing information signals recorded on a video tape.
Figure 3:
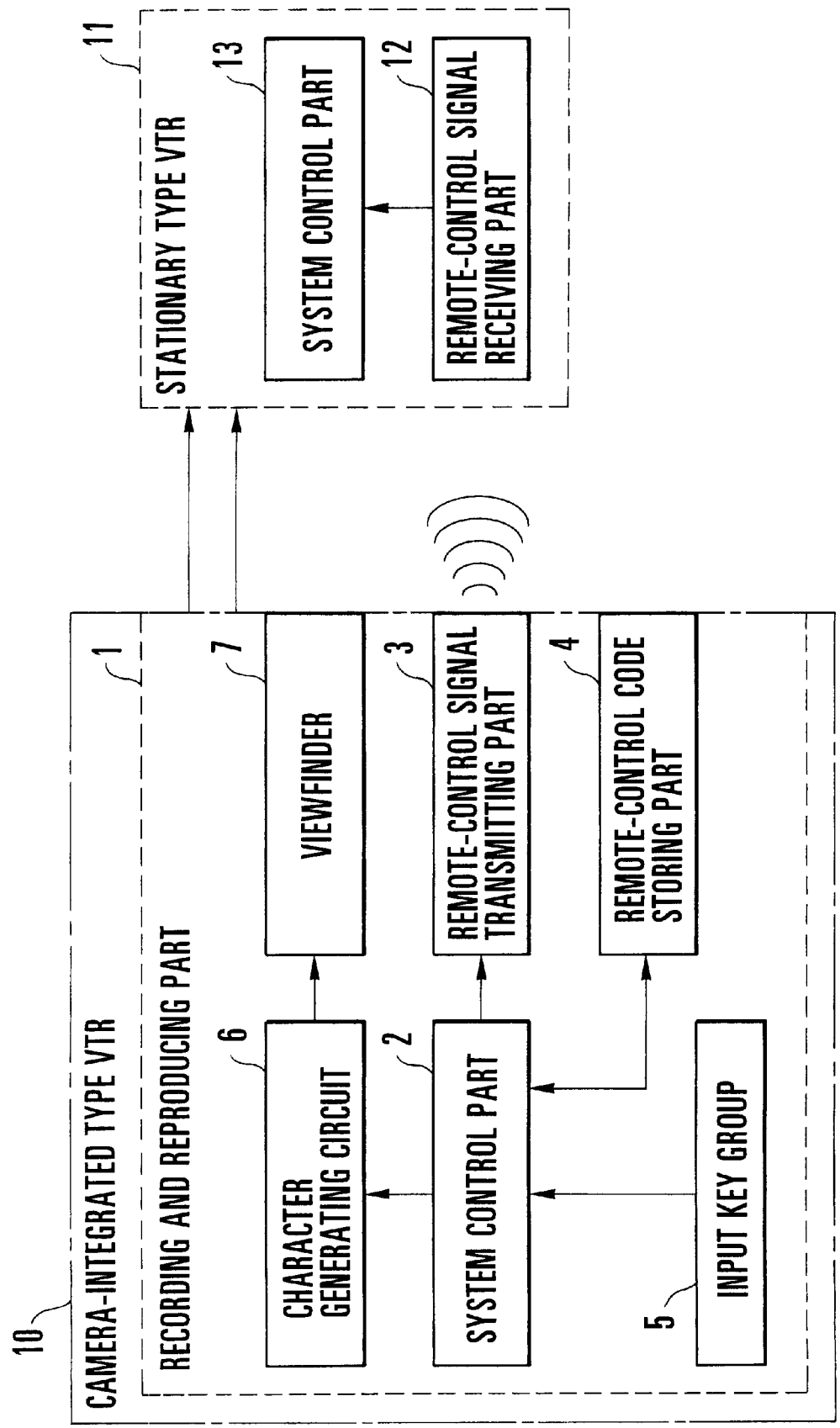
FIG. 3 is a block diagram showing the arrangement of a camera-integrated type VTR according to an embodiment of the invention and that of a stationary type VTR which is used for editing in conjunction with the camera-integrated type VTR.

FIG. 3 is a block diagram showing the arrangement of a camera-integrated type VTR 10 according to an embodiment of the invention and that of a stationary type VTR 11 which is used for editing in conjunction with the camera-integrated type VTR 10.

Referring to FIG. 3, the camera-integrated type VTR 10 has an editing function for editing video signals recorded on a recording medium such as a magnetic tape, in conjunction with the stationary type VTR 11 which is remotely operable. The camera-integrated type VTR 10 is provided with a recording and reproducing part 1 for recording and reproduction. The recording and reproducing part 1 includes a system control part 2 arranged to control the processes of the editing function as well as control over the whole apparatus, a remote-control signal transmitting part 3, a remote-control code storing part 4, an input key group 5 provided for input of data of various kinds, a character generating circuit 6 and a viewfinder 7.

For the editing function, the remote-control code storing part 4 is arranged to register beforehand VTRs usable for editing and to hold code strings forming remote-control signals which are respectively associated for use with the VTRs as registered. The remote-control code storing part 4 is composed of a ROM of a one-chip microcomputer built-in type. The contents held in the remote-control code storing part 4 are written in beforehand, for example, during a manufacturing process thereof.

For editing, a selecting process is performed to select, as desired, one of the VTRs registered at the remote-control code storing part 4 so as to use the selected VTR for editing. In the case of this embodiment, the stationary type VTR 11 is assumed to be selected and used for editing.

The editing function includes the above-stated VTR selecting process and a signal transmitting process.

The VTR selecting process includes a display process, a determining process and a used code setting process. In the display process, the character generating circuit 6 is caused to generate character information showing a list of the VTRs registered at the remote-control code storing part 4 and the character information is displayed in a menu picture at the viewfinder 7. In the determining process, a desired one of VTRs displayed on the menu picture is designated by means of the input key group 5 and the designated VTR is determined as a VTR to be used for editing. In the used code setting process, remote-control codes associated with the determined VTR are set to be used for editing.

In the signal transmitting process, a code string associated with the stationary type VTR 11 is read out from the remote-control code storing part 4 in association with a reproducing action of the recording and reproducing part 1. A remote-control signal formed by the code string read out is then transmitted from the remote-control signal transmitting part 3 to the stationary type VTR 11 with an infrared light employed as a carrier wave.

The stationary type VTR 11 includes a recording and reproducing part (not shown) built in the body of the stationary type VTR 11, a remote-control signal receiving part 12, a system control part 13 and a remote-control signal transmitter (not shown) disposed outside the stationary type VTR 11.

The system control part 13 is arranged to control the operation of the whole stationary type VTR 11 including control over its recording and reproducing actions and control actions to be carried out according to remote-control signals transmitted from the remote-control signal transmitter. In addition to these control actions, processes of editing the video signals recorded by the camera-integrated type VTR 10 are also arranged to be controlled by the system control part 13.

In controlling the processes of editing video signals recorded by the camera-integrated type VTR 10, the remote-control signal transmitted from the camera-integrated type VTR 10 is received by the remote-control signal receiving part 12. Then, operations of the stationary type VTR 11 are controlled on the basis of the remote-control signal received. More specifically, when the remote-control signal receiving part 12 receives a pause cancel instruction from the remote-control signal transmitting part 3 of the camera-integrated type VTR 10 while a recording action of the stationary type VTR 11 is in a paused state, the system control part 13 releases the recording action from the paused state in response to the pause cancel instruction so as to resume the recording action. On the other hand, when a pause instruction transmitted from the remote-control signal transmitting part 3 of the camera-integrated type VTR 10 is received by the remote-control signal receiving part 12 while a recording action of the stationary type VTR 11 is in process, the recording action is put to a paused state in response to the pause instruction.

Figure 4:
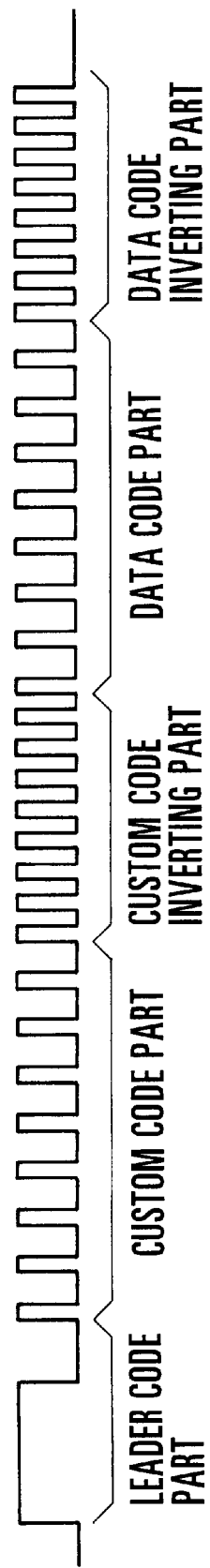
FIG. 4 shows one example of remote-control codes which are held at a remote-control code storing part of the camera-integrated type VTR shown in FIG. 3 and which are associated with every applicable kind of VTR.

The remote-control codes which are respectively associated with applicable VTRs and held at the remote-control code storing part 4 of the camera-integrated type VTR 10 shown in FIG. 3 will be next described. FIG. 4 shows one example of such a remote-control code.

Referring to FIG. 4, the remote-control codes which are respectively associated with applicable VTRs and held at the remote-control code storing part 4 include respective code strings of the pause instruction and the pause cancel instruction. In the case of an example shown in FIG. 4, the remote-control code is composed of a leader code part, a custom code part, a custom code inverting part, a data code part and a data code inverting part. These parts are arranged in the order of sequential transmission. The transmission end of these parts is considered to be an end of one cycle. The cycle is repeated in transmitting the remote-control code.

Among these code parts, the leader code part serves as a trigger for a start of a remote-control signal. The custom code part indicates a code for a VTR manufacturer and a code which is set according to the kind of an applicable VTR. The data code indicates an instruction such as a pause instruction. Each of the custom code inverting part and the data code inverting part is composed of a code obtained by inverting the custom code or the data code and is sent out for the purpose of assuring the corresponding code parts.

VTRs of many different kinds are manufactured by one VTR manufacturer in general. However, since remote-control codes of one and the same kind are often usable in common for VTRs of different kinds, remote-control codes of only two or three kinds are actually arranged to be held at the remote-control code storing part 4.

Figure 5:
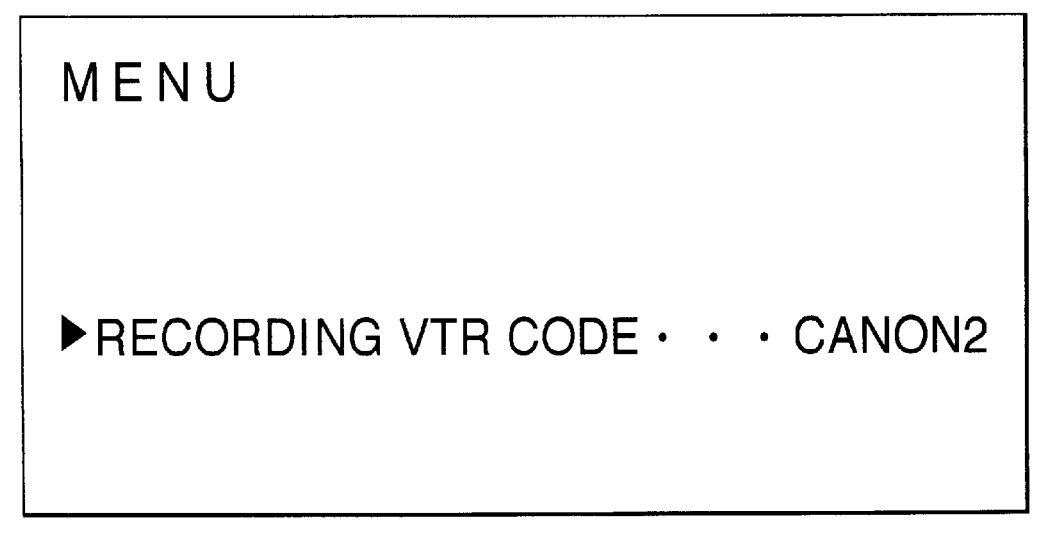

The processes of editing video signals recorded by the camera-integrated type VTR 10, by using the stationary type VTR 11, will be next described with reference to FIG. 5. FIG. 5 shows, by way of example, a menu picture displayed at the viewfinder 7 of the camera-integrated type VTR 10 shown in FIG. 3.

An operation is first performed to select and designate the stationary type VTR 11 (recording-side VTR) to be used for editing. In this operation, the system control part 2 is instructed by pushing down a predetermined key of the input key group 5 so as to carry out the process of selecting the recording-side VTR.

In the recording-side VTR selecting process, the character generating circuit 6 generates character information showing a list of VTRs registered at the remote-control code storing part 4. Then, a menu picture showing the character information is displayed at the viewfinder 7.

When one of the VTRs shown on the menu picture is designated through the input key group 5, the designated VTR is determined as the recording-side VTR to be used for editing. Then, remote-control codes associated with the determined VTR are set to be used for editing.

Subsequently, a recording action of the stationary type VTR 11 is held in a paused state, and the camera-integrated type VTR 10 begins to reproduce video signals from a predetermined editing start position.

At the commencement of the reproducing action of the camera-integrated type VTR 10, a remote-control code for a pause cancel instruction is read out from the remote-control code storing part 4. Then, a remote-control signal which is composed of the remote-control code is transmitted from the remote-control signal transmitting part 3 to the stationary type VTR 11 with an infrared light used as a carrier wave. At the stationary type VTR 11, the remote-control signal of the pause cancel instruction transmitted from the remote-control signal transmitting part 3 is received by the remote-control signal receiving part 12. The system control part 13 then releases the recording action from the paused state in response to the pause cancel instruction indicated by the remote-control signal. As a result, the video signals reproduced by the recording and reproducing part 1 of the camera-integrated type VTR 10 are transmitted to the stationary type VTR 11 via video and audio signal lines and are recorded on a magnetic tape by the stationary type VTR 11.

When the video signals are reproduced up to a predetermined editing end point by the camera-integrated type VTR 10, the reproducing action is put to a paused state. With the reproducing action coming into the paused state, a remote-control code for a pause instruction is read out from the remote-control code storing part 4. A remote-control signal which is composed of the remote-control code read out is then transmitted from the remote-control signal transmitting part 3 to the stationary type VTR 11 with an infrared light used as a carrier wave. The remote-control signal transmitted from the remote-control signal transmitting part 3 is received by the remote-control signal receiving part 12. Then, in response to the pause instruction indicated by the remote-control signal, the system control part 13 puts the recording action to a paused state. Thus, the recording action of the stationary type VTR 11 on the video signals reproduced by the camera-integrated type VTR 10 is thus put to the paused state.

Video signals recorded by the camera-integrated type VTR 10 can be edited with these processes repeated.

As described above, when one of the registered VTRs displayed on the menu picture is designated through the input key group 5 in the selecting process, the designated VTR is determined and set as a recording-side VTR to be used for editing. Then, remote-control codes which are associated with the VTR and held at the remote-control code storing part 4 are set to be used for editing. Therefore, unlike the conventional arrangement, the invented arrangement described above dispenses with the processes for holding respective code strings of a pause instruction and a pause cancel instruction at the remote-control code storing part 4. In other words, the invented arrangement obviates the necessity of the conventional processes of receiving a remote-control signal applicable to the stationary type VTR 11, analyzing the remote-control signal received and extracting a corresponding code string. Control actions thus can be saved from becoming complex due to these processes, thereby permitting a reduction in cost. Further, the invented arrangement obviates the necessity of work conventionally required for the process of storing at the remote-control code storing part 4 the respective code strings of the pause instruction and the pause cancel instruction every time the kind of the stationary type VTR 11 to be used for editing varies. The editing function of editing video signals recorded on a recording medium, by using the remotely operable stationary type VTR 11, therefore, can be simply carried out at a low cost.

With the remote-control codes of the pause instruction and the pause cancel instruction for the stationary type VTR 11 arranged to be held at the remote-control code storing part 4 in editing video signals recorded by the camera-integrated type VTR 10 by using the stationary type VTR 11 in conjunction, the recording action of the stationary type VTR 11 can be controlled with remote-control signals transmitted in association with the reproducing action of the camera-integrated type VTR 10. This arrangement obviates the necessity of use of an editing machine and also permits selection of the kind of a VTR usable as the stationary type VTR 11 almost without limitation.

Further, since the recording action of the stationary type VTR 11 is controlled by the remote-control signals transmitted in association with the reproducing action of the camera-integrated type VTR 10, the recording action of the stationary type VTR 11 and the reproducing action of the camera-integrated type VTR 10 can be easily synchronized with each other, thereby permitting editing processes to be highly accurately carried out.

In the case of this embodiment, a menu picture is used for selection and designation of a VTR to be used for editing. However, the use of a menu picture may be replaced with a method for selecting a VTR by operating a key which is provided for inputting data for selection and designation of VTRs registered.

While this embodiment is arranged, by way of example, to hold the remote-control codes of the pause instruction and the pause cancel instruction for use of them in editing, the editing work can be carried out more freely and in a more refined manner with remote-control codes of some other operation instructions such as fast feeding, rewinding, etc., also held and used in addition to the remote-control codes of the pause instruction and the pause cancel instruction.

As described above, the camera-integrated type VTR according to the embodiment of the invention can be arranged at a low cost to have the editing function whereby editing work can be simply carried out in conjunction with an external recording apparatus on video signals recorded on a recording medium. The invented arrangement described also permits adequate control over the recording action of the external recording apparatus, i.e., the stationary type VTR 11, in association with a reproducing action of the camera-integrated type VTR. The recording action and the reproducing action can be easily synchronized with each other by reliably transmitting remote-control signals in accordance with the reproducing action, so that editing processes can be highly accurately carried out. Further, the arrangement described facilitates the selection of an external recording apparatus to be used for editing.

A magnetic recording and reproducing apparatus according to another embodiment of the invention will be next described below. The arrangement of the magnetic recording and reproducing apparatus is applicable to a VTR having a built-in editing function.

Figure 6:
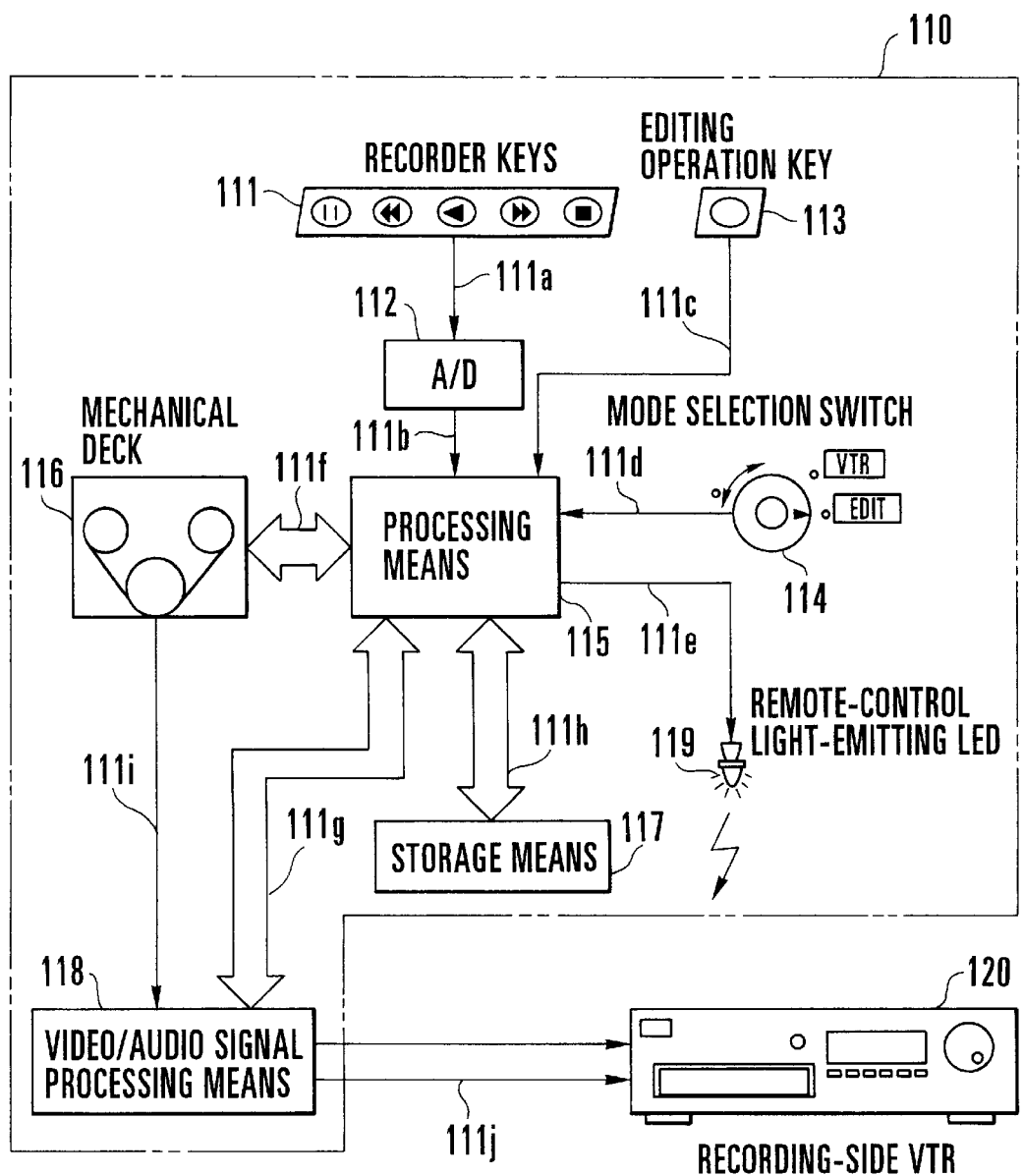
FIG. 6 is an explanatory block diagram showing the arrangement of a VTR having an editing function according to another embodiment of the invention.

The arrangement of the VTR having the built-in editing function according to the embodiment of the invention is shown in FIG. 6. In FIG. 6, reference numeral 110 denotes the VTR having the built-in editing function on the side of reproduction.

The VTR 110 includes recorder keys 111 for reproducing and pausing operations on the VTR 110. A DC voltage 111$a$ is generated in accordance with one of the keys 111 pushed down. An A/D (analog-to-digital) converter 112 is arranged to A/D convert the DC voltage 111$a$. An editing operation key 113 is provided for an editing operation.

A mode selection switch 114 is arranged to permit switching between a normal VTR mode and an editing mode. A processing means 115 is provided for control over the actions of the whole VTR 110. Reference numeral 116 denotes a mechanical deck. A storing means 117 is provided for reading and writing by the processing means 115. A video/audio signal processing means 118 is arranged to receive reproduced signals from the mechanical deck 116 and to process video and audio signals.

A remote-control light emitting diode (LED) 119 is arranged to emit light according to a remote-control command 111$e$ issued from the processing means 115. A VTR 120 is arranged on a recording side to record video and audio signals 111$j$ supplied from the video/audio signal processing means 118, by receiving the light emitted from the remote-control LED 119. In FIG. 6, all parts other than the recording-side VTR 120 are included in the reproducing-side VTR 110.

The reproducing-side VTR 110, i.e., the VTR 110 on the reproducing side, has at least two operation modes, i.e., the normal VTR mode and the editing mode which is for an editing programming process and an editing process. These modes are selectable by the mode selection switch 114.

The operation modes of the reproducing-side VTR 110 change according to the normal VTR mode or the editing mode and also according to an operation input to the processing means 115, i.e., a digital voltage signal 111$b$ from the A/D converter 112 and an editing operation signal 111$c$ from the editing operation key 113. The processing means 115 then controls peripheral parts according to the mode selected.

The processing means 115 detects the state of the mechanical deck 116 through sensors of various kinds and sends to the mechanical deck 116, via a signal line 111$f$, a command or the like for control over a start, a stop and a rotating direction of each motor according to the change of the operation mode of the VTR 110. The processing means 115 also sends a reproducing or muting command, character information for a display, etc., to the video/audio signal processing means 118 via a signal line 111$g$ according to the change of the operation mode of the VTR 110, etc.

In the case of the editing mode, the processing means 115 stores, in the storing means 117, count values of cut-in and cut-out points programmed by the editing operation keys 113 during a programming operation. When performing an editing action, the processing means 115 controls a reproducing action and generates commands according to data stored in the storing means 117. More specifically, the processing means 115 performs control in such a way as to begin the reproducing action just before the cut-in point as programmed and to send out remote-control data for a start of recording to the remote-control LED 119 when the cut-in point is passed. Then, reproduction is allowed to be carried on in a normal manner. Remote-control data for an end of recording is sent out again to the remote-control LED 119 when the cut-out point is passed. The editing action is thus carried out by repeating the above-mentioned control actions on a plurality of programmed data.

Figure 7:
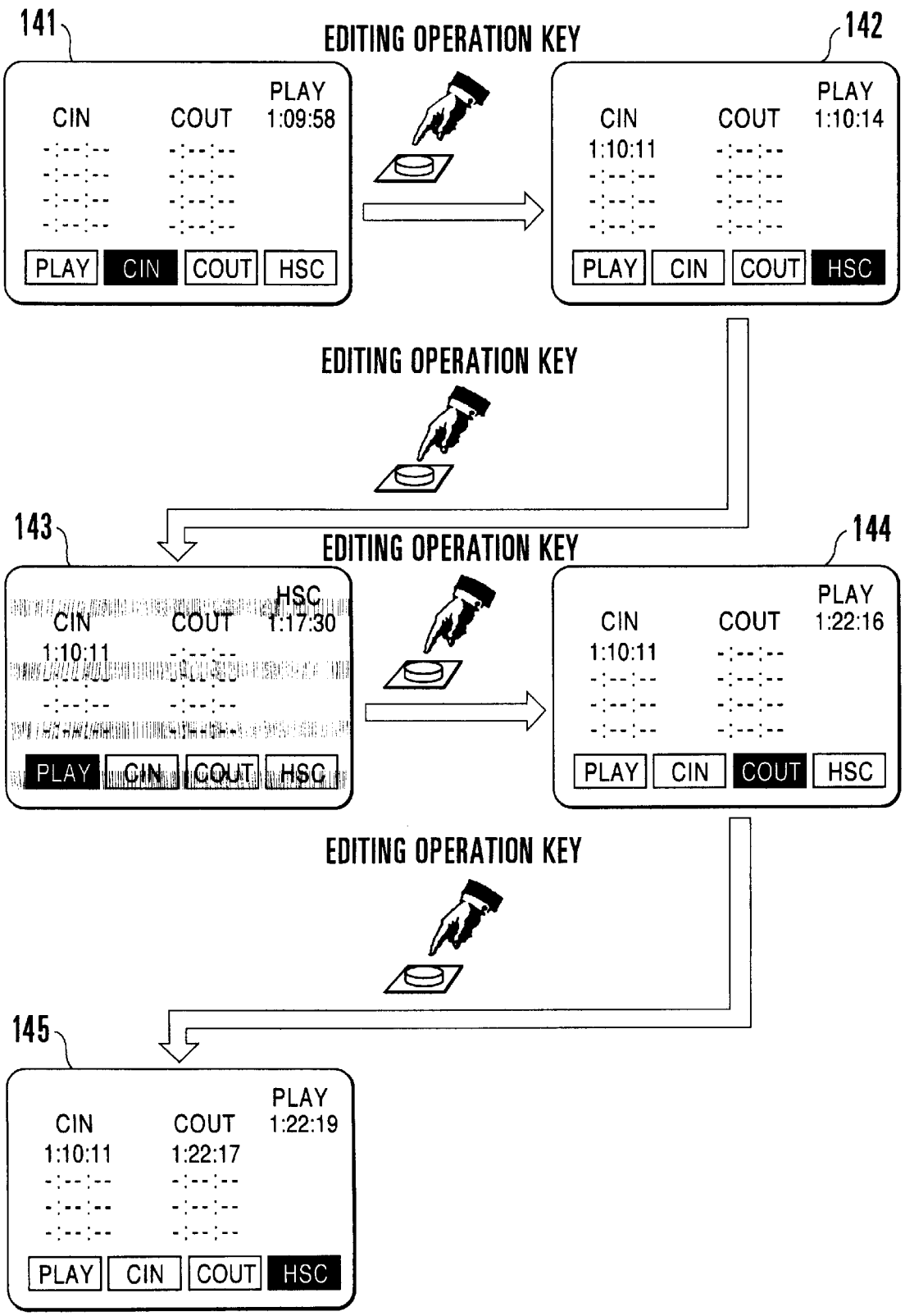
FIG. 7 is an explanatory diagram showing output pictures displayed when the VTR shown in FIG. 6 is in an editing mode.

The editing action of the VTR 110 having the built-in editing function will be described as follows. FIG. 7 is an explanatory diagram showing output pictures obtained when the VTR 110 having the built-in editing function is in the editing mode. The layout of the output pictures is described first with reference to a picture display 141. The picture display 141 includes a part "PLAY" at an upper right part showing the current operation mode. Count information "1:09:58" below the part "PLAY" indicates the current position of a tape (recording medium). The count values of the cut-in points as already programmed are arranged to be indicated on the left side in the middle of the picture display 141 and are now shown as "-:--:--" representing an unprogrammed state. The count values of the cut-out points as already programmed are arranged to be indicated on the right side in the middle of the picture display 141 and are now shown also as "-:--:--" representing an unprogrammed state. A group of icons representing the functions selectable by the editing operation key 113 are indicated in the lower part of the picture display 141.

In FIG. 7, the picture display 141 indicates the reproduction in a state of not being programmed as yet. In this state, the editing operation keys 113 functions to input the cut-in point. With this input made as an initial function, the function of the editing operation key 113 cyclically varies in the following sequence every time it is pushed once.

HSC (a high-speed search) → PLAY → COUT (cut-out input) → HSC → PLAY → CIN (cut-in input).

One of the group of icons "PLAY", "CIN", "COUT" and "HSC" corresponding to the function currently selected among others is displayed in an inverse state. The picture display 141 changes to another picture display 142 when the editing operation key 113 is pushed down. Then, a count value of the tape position "1:10:11" obtained at a point of time when the editing operation key 113 is pushed down is stored as a cut-in point at the storing means 17 and the position of the cut-in point is displayed in the picture display 142.

In this instance, the current operation mode of the VTR 110 is a normal reproduction mode. The editing operation key 113 is set for the function HSC. When the editing operation key 113 is pushed down in this state, the picture display 142 changes to a picture display 144 showing that the current operation mode of the VTR 110 has changed over to the high-speed search mode to permit an operation for quick arrival at a cut-out point while watching a reproduced picture.

The editing operation key 113 is set for the function "PLAY" at this point of time, as inversely displayed in the lower part of the picture display 143. Then, the operator (user) again pushes the editing operation key 113 when the reproduced picture is found to have come near to a desired cut-out point. With the editing operation key 113 pushed again, the picture display 143 changes to a picture display 144. Then, as shown in the picture display 143, the picture changes to a normal reproduced picture and the function of the editing operation key 113 changes to an input of a cutout point.

When the editing operation key 113 is pushed at a desired reproducing point, a count value "1:22:17" is stored at the storing means 117 as a cut-out point. Then, the cut-out point appears on a picture display 145 as shown in FIG. 7.

The display arrangement enables the operator to decide a cut-out point by carefully viewing pictures through a normal process of reproduction. At this point of time, the editing operation key 113 is again set for the function "HSC", so that the tape can be quickly transported to the next cut-in point.

Figure 8:
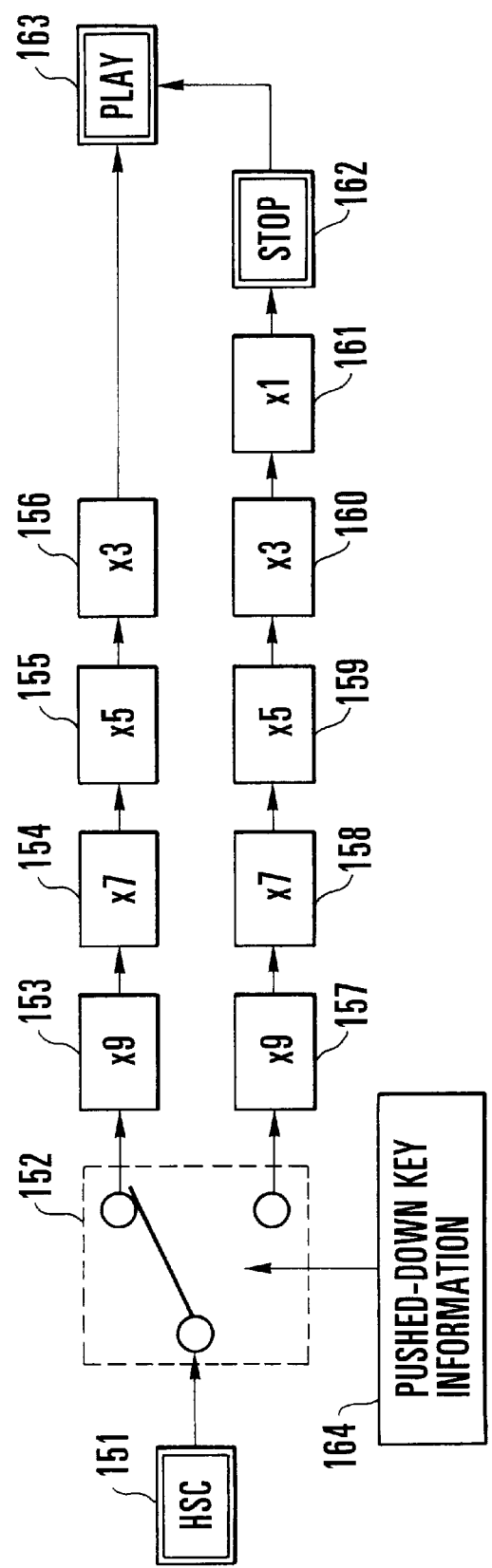
FIG. 8 is an explanatory diagram showing the transition of operation modes at the time of programming for editing.

FIG. 8 is an explanatory diagram showing the transition of operation modes at the time of programming for editing. The details of the transition from the forward high-speed search mode (HSC) indicated by reference numeral 151 to the normal reproduction mode (PLAY) indicated by reference numeral 163 are shown in FIG. 8. The transition has two different routes. One of the two routes is selected by shifting the position of a switch 152 according to information 164 on the key pushed down.

More specifically, in cases where the pushed-down key information 164 derives from the editing operation key 113, the transition takes place to change the function "HSC" 151 to the function "PLAY" 163 via a first route including a nine-times speed (×9) indicated by reference numeral 153 through a three-times speed (×3) indicated by reference numeral 156. If the pushed-down key information 164 derives from the recorder keys 111, the transition to the function "PLAY" 163 takes place via a second route which is shown below the first route and includes a nine-times speed (×9) indicated by reference numeral 157 through a one-time speed (×1) indicated by reference numeral 161 and a function "STOP" 162. Since the second route is an ordinary transition of operation modes, it is impossible to continuously confirm reproduced pictures because the reproduced pictures are muted during the process of the transition.

In the case of a programming operation by means of the editing operation key 113, on the other hand, the reproduced pictures can be continuously confirmed because they are always displayed during the process of programming.

Further, it is possible to have the transition of the forward high-speed search mode "HSC" to the normal reproduction mode "PLAY" take place, in the editing mode, in a state of continuously making picture displays by controlling the position of the switch 152 according to information from the mode selection switch 114. With the switch 152 controlled in this manner, the programming for editing can be more smoothly carried out.

In the case of the programming by means of the editing operation key 113, the forward high-speed search mode "HSC" 151 shifts (changes) to the normal reproduction mode "PLAY" 163 without passing through the mode "STOP" 162. Therefore, in this case, the tape and the capstan do not have to be released from being in pressed contact with each other. In other words, in the case of a counter method whereby pulses obtained from a rotary body are counted, the count value never deviates from the tape position in programming by means of the editing operation key 113. The correlation of the count value to the cut-in and cut-out editing points never deviates, so that editing work can be accurately carried out.

Figure 9:
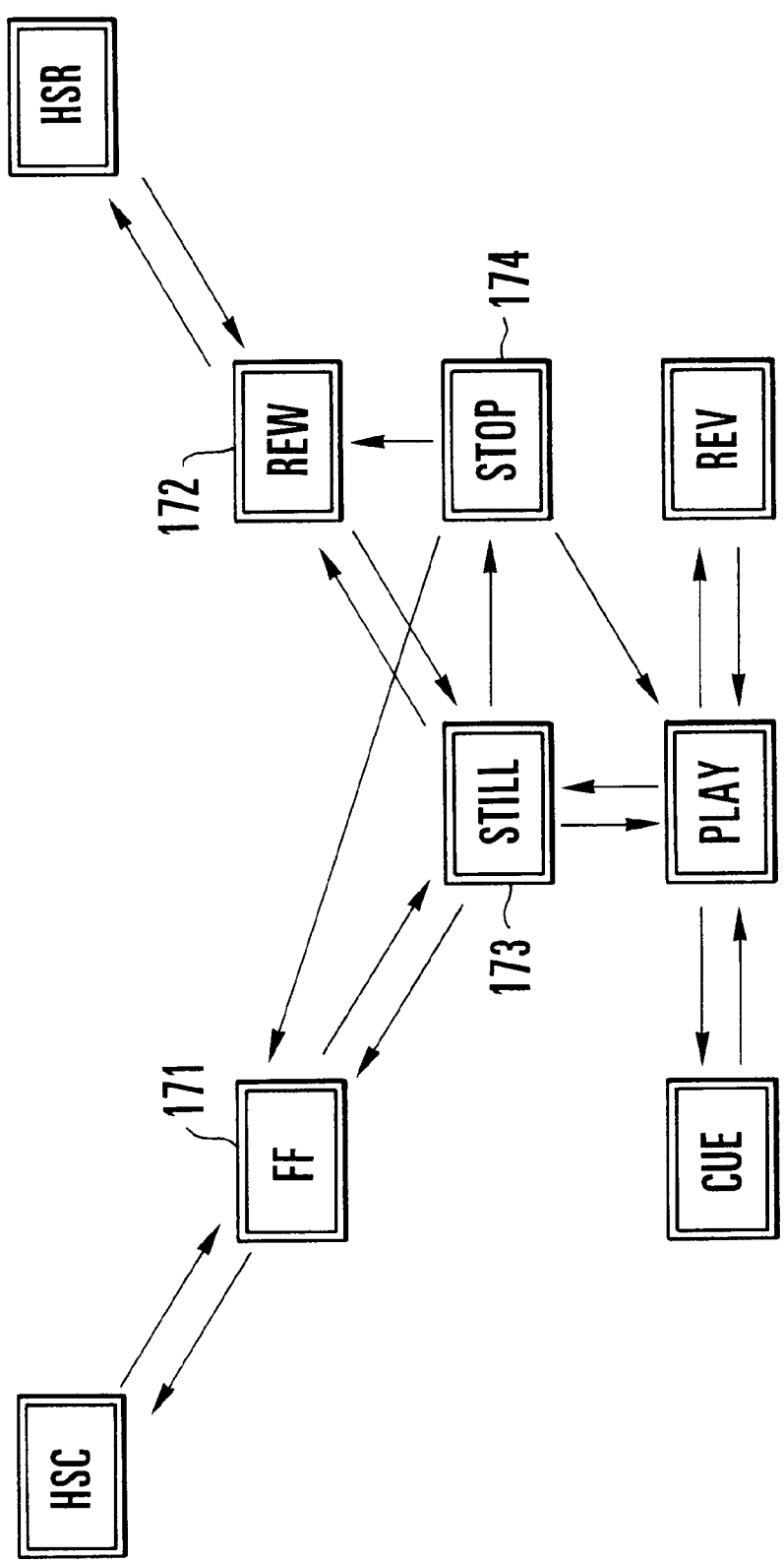
FIG. 9 is an explanatory diagram showing the transition of operation modes where a tape and a capstan are not released from being in pressed contact with each other while an editing action is in process.

FIG. 9 is an explanatory diagram showing the transition of operation modes where the tape and the capstan are not released from being in pressed contact with each other while an editing action is in process. In the case of a mode transition with a STOP key pushed, the mode shifts to a mode "STILL" 173 in which a still image is reproduced, instead of shifting to a mode "STOP" 174. The mode shifts to the mode "STOP" 174 only when the STOP key is pushed in the mode "STILL" 173.

Further, in the case of FIG. 9, if a mode "HSC" is used in place of a mode "FF" (fast feeding) 171 and a mode "HSR" (backward high-speed search) is used in place of a mode "REW" (rewinding) 172, the tape count value never deviates and output pictures can be constantly confirmed unless the mode shifts to the mode "STOP" 174.

The arrangement of the magnetic recording and reproducing apparatus described above according to the second embodiment of the invention enables the operator to easily prepare an editing program. In editing, the programmed editing points such as editing start and end points can be easily found. In carrying out a programming operation, the editing start and end points also can be readily found. Since the embodiment is arranged to effectively eliminate any discrepancies between a tape transporting distance and a count value of the distance, editing work can be accurately accomplished. The embodiment thus enables the operator to carry out a programming operation for editing without difficulty.

We claim:

1. A camera-integrated type signal recording apparatus, comprising:

(A) a viewfinder being included in said camera-integrated type signal recording apparatus;

(B) outputting means for outputting a video signal reproduced from a recording medium to an external recording apparatus;

(C) storing means for storing a plurality of command data to remotely operate a plurality of kinds of said external recording apparatuses usable as said external recording apparatus, each of the plurality of command data corresponding to each of said plurality of kinds of said external recording apparatuses;

(D) display control means for generating information to be displayed indicative of kinds of said plurality of kinds of said external recording apparatuses respectively corresponding to the plurality of command data stored in said storing means and displaying the information on said viewfinder;

(E) selecting means for selecting at least one external recording apparatus from among said plurality of kinds of said external recording apparatuses corresponding to the information displayed on said viewfinder by said display control means; and (F) read-out means for reading out from said storing means command data corresponding to said external recording apparatus selected by said selecting means, said command data thus read out being one of the plurality of command data and outputted to control said selected external recording apparatus.

2. An apparatus according to claim 1, wherein said read-out means reads out from said storing means said command data related to a start of a recording action of said selected external recording apparatus, according to a start of a reproducing action of said camera-integrated type signal recording apparatus.

3. An apparatus according to claim 2, further comprising and operation key for bringing said camera-integrated type signal recording apparatus to an editing mode, said camera-integrated type signal recording apparatus being brought to an editing mode according to an operation of said operation key, said read-out means reading out from said storing means said command data for a recording pause of said selected external recording apparatus, according to an operation of said operation key.

4. An apparatus according to claim 3, wherein in the editing mode said read-out means reads out from said storing means said command data for a cancel instruction of the recording pause of said selected external recording apparatus, according to a start of a reproducing action of said camera-integrated type signal recording apparatus.

5. An apparatus according to claim 3, wherein said read-out means reads out from said storing means said command data for a cancel instruction of the recording pause of said selected external recording apparatus, according to a start of reproducing the video signal from a predetermined editing start position on said recording medium.

6. An apparatus according to claim 1, wherein said read-out means reads out from said storing means said command data related to a stop of a recording action of said selected external recording apparatus, according to a stop of a reproducing action of said camera-integrated type signal recording apparatus.

7. An apparatus according to claim 6, wherein said read-out means reads out from said storing means said command data for a recording pause of said selected external recording apparatus, after the video signal is reproduced up to a predetermined editing end position on said recording medium.

8. An apparatus according to claim 1, further comprising emitting means for emitting infrared pulse light on the basis of said command data read out by said read-out means, the infrared pulse light thus emitted being outputted to said selected external recording apparatus.

9. An apparatus according to claim 1, wherein said display control means generates information to be displayed indicative of kinds of said plurality of kinds of external recording apparatuses and displays a list of the information on said viewfinder.

10. A camera-integrated type signal recording apparatus comprising:

(A) a display being included in said camera-integrated type signal recording apparatus;

(B) an output terminal for outputting a video signal reproduced from a recording medium to an external recording apparatus;

(C) a memory for storing a plurality of command data to remotely operate a plurality of kinds of said external recording apparatuses, each of the plurality of command data respectively corresponding to each of said plurality of kinds of external recording apparatuses; and (D) a controller for generating information to be displayed indicative of kinds of said plurality of kinds of said external recording apparatuses respectively corresponding to the plurality of command data stored in said memory and displaying the information thus generated on said display, said controller selecting at least one external recording apparatus from among said plurality of kinds of said external recording apparatuses and reading out from said memory command data corresponding to said selected external recording apparatus, said command data thus read out being one of the plurality of command data and outputted to control said selected external apparatus.

11. An apparatus according to claim 10, wherein said controller generates information to be displayed indicative of kinds of said plurality of kind of external recording apparatuses and displays a list of the information on said display.

* * * * *